March 31, 1970     W. F. BARNES     3,503,195

MOWING MACHINE

Filed March 2, 1967

INVENTOR
WALTER F. BARNES
BY
Dick, Zarley, McKee & Thomte
ATTORNEYS

United States Patent Office 3,503,195
Patented Mar. 31, 1970

3,503,195
MOWING MACHINE
Walter F. Barnes, R.R. 2, Bedford, Iowa 50833
Filed Mar. 2, 1967, Ser. No. 620,159
Int. Cl. A01d 63/02
U.S. Cl. 56—314        7 Claims

ABSTRACT OF THE DISCLOSURE

A turning device for one end of a cutter bar to provide a path cleared of cut material. The turning device or roto divider includes a rotatable roller mounted rearwardly of the outer end of the cutter bar and extending rearwardly and transversely thereof such that the roller rotates forwardly as the cutter bar advances. The roller has a nose shaped forward end to minimize collecting cut material and also minimize frictional drag on the ground. The roller is also mounted on the outer side of an outer shoe secured to the outer end of the cutter bar. An alternate embodiment of the roller involves a cylindrical member telescopingly received in a nose portion secured to the outer shoe. The roller is free to pivot upwardly to ride over obstructions on the ground and is limited against downward pivotal movement when the cutter bar is raised to a vertical position.

---

Conventional outer shoes with rearwardly extending rods or the like have been unsatisfactory because they do not provide a clean path at the outer end of the cutter bar. Some of the cut grain will accumulate on the outer shoe and at times clog the cutting mechanism. The path at the outer end of the cutter bar is necessary such that when the cutting implement makes a return cut there is a path for the cutter bar inner shoe whereby that shoe will not gather cut material and become clogged.

Thus, the roller roto divider device of this invention is foolproof in operation and very effectively assures the turning over of the cut grain at the outer end of the cutter bar such that a cleared path is formed. The minimal contact of the roller with the ground will rotate the roller forwardly and thus tend to turn the grain transversely inwardly along the cutter bar. Moreover, the grain falling upon the roller tends to rotate the roller in a forward direction. There is no possibility of the roller becoming clogged as its forward end is outwardly of the outer shoe and is also provided with a nose portion which guides the roller through any standing grain. The speed of rotation of the roller may be varied by changing the angular relationship of it relative to the cutter bar. Moreover, the angular relationship to the ground may be changed as is desired. The roller of this invention is designed to be attached directly to existing outer shoes and replace conventional turning devices. The rear end of the roller is completely exposed and requires no securing means which would tend to collect grain and clog the device thereby preventing its operation. A minimum of frictional drag is produced by the roller since only a small peripheral segment of the forward convex nose contacts the ground and in the second embodiment the roller is rotated by the falling grain and by contact with the stubble on the ground.

These and other features and advantages of this invention will become readily apparent to those skilled in the art upon reference to the following description when taken into consideration with the accompanying drawings, wherein.

Figure 1:
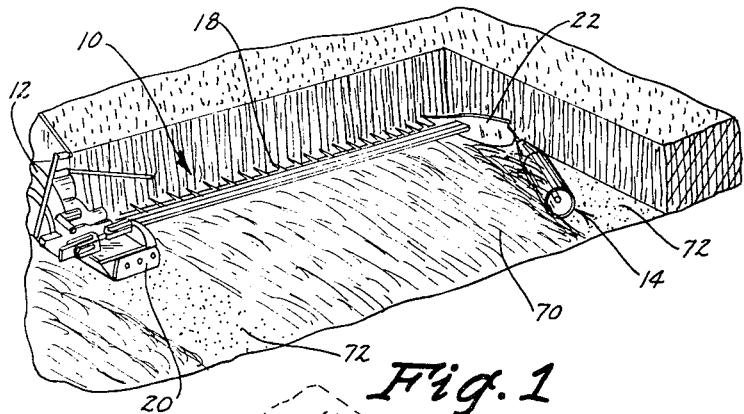
FIG. 1 is a perspective view of a mower device having the turning or roto divider device of this invention.
Figure 2:
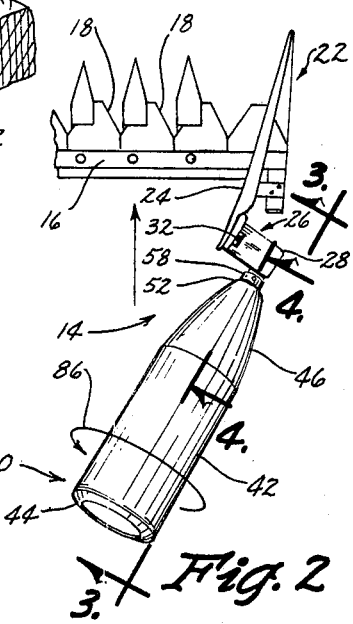
FIG. 2 is a fragmentary top plan view of the roto divider device on the outer end of a cutter bar.
Figure 3:
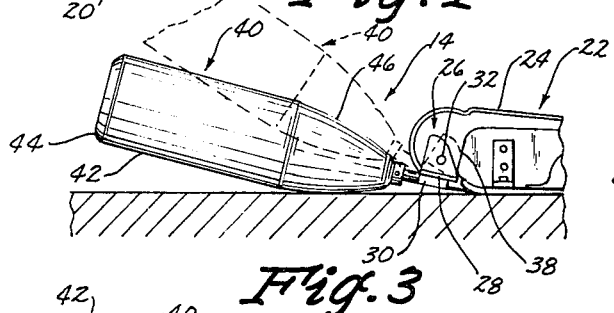
FIG. 3 is a cross sectional view taken along line 3—3 in FIG. 2.

In FIG. 1 the cutter assembly is referred generally by the reference numeral 10 and is shown atached to a mower frame 12. A swath forming device or roto divider 14 is secured to the outer end of the cutter assembly 10.

The cutter assembly includes a cutter bar 16 having cutter blades 18 extending along its substantial length and an inner cutter bar shoe 20 and an outer shoe 22. It is seen that the outer shoe 22 is a vertical plate member having a portion 24 extending rearwardly of the cutter bar 16. An L-shaped bracket 26 is secured on the outer side of the portion 24 and includes an outwardly extending leg element 28 to which an elongated shaft 30 is welded. The elongated shaft 30 extends rearwardly of the plate portion 24 and the cutter bar 16. The bracket 26 is pivotally connected to the plate portion 24 by a bolt 32. The bracket 26 also includes a vertical leg portion 34 having a rounded forward edge 36 which is adapted to matingly engage a shoulder 38 on the outer side of the plate portion 24 and thus limit the downward pivotal movement of the bracket 26 and the shaft 30.

As seen in FIGS. 1 through 4, a roller 40 is mounted on the shaft 30. The roller includes an elongated cylindrical portion 42 having a rounded peripheral rear end 44 and merges at its forward end with a nose portion 46 which has a generally convex outer exterior surface. A wall 48 is positioned in the roller at the junction of the nose 46 and the cylinder 42. A bearing sleeve 50 extends along the center axis of the cylinder and nose and is mounted in the wall 48 and the forward end 52 of the nose 46. A pair of locking collars 58 and 59 are provided on shaft 30 at opposite ends of the bearing sleeve 50 to limit the movement of the shaft 30 within the sleve 50 but yet permit rotation of the unit. A grease nipple 60 is provided in the end of the shaft 30 and communicates with a passageway 62 to provide lubricating means to the inside of the bearing sleeve 50.

Figure 4:
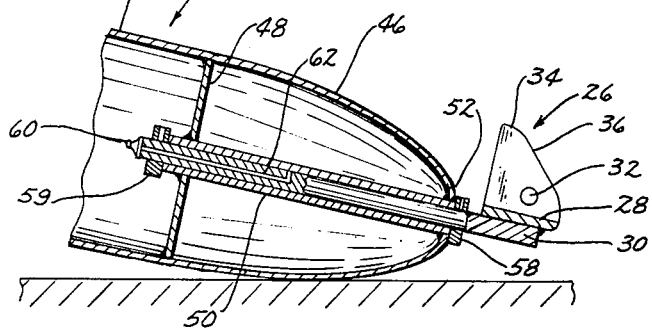
FIG. 4 is a cross sectional view taken along line 4—4 in FIG. 2.

It is seen in FIG. 4 for example that by the cone 46 having a convex surface that it only engages the ground along a very narrow peripheral segment and in effect has line contact with the ground regardless of the angle it makes with the ground. This of course minimizes the frictional drag of the unit as it moves over the ground. The cylinder 40 extends rearwardly and transversely of the cutter bar 16 such that it will receive the cut material 70 and roll it inwardly along the cutter bar to form a clean swath path 72 in which the inner cutter bar shoe 20 may travel on the next cutting operation. The cylinder 42 also extends at an upward angle relative to the cutter bar 16 and the ground to better facilitate catching the cut material 70 and turning it inwardly. It is obvious that as the cutter bar moves forwardly and the roto divider engages the ground it will rotate forwardly as indicated by the arrow 86 in FIG. 2. Furthermore, it is to be appreciated that the forward end of the nose 46 is positioned outwardly of the cutting blades 18 and more specifically is on the outside of the swath board 22 and thereby eliminates any possible clogging of the unit by cut material. The cut material engaging the inner surface of the swath board 22 will move along its length and then hit the convex surface of the cone portion 46 and then move therealong and be rolled over by the nose portion or the cylindrical portion 42.

Also, should the roto divider hit any obstructions or the like, it is free to pivot upwardly since it is pivotally connected to the outer shoe 22, but when the cutter bar 16 is raised to a vertical position the roto divider will not pivot downwardly since it will be limited in this pivotal movement by the engagement of the bracket 26 with the shoulder 38 on the outer shoe 22.

Figure 5:
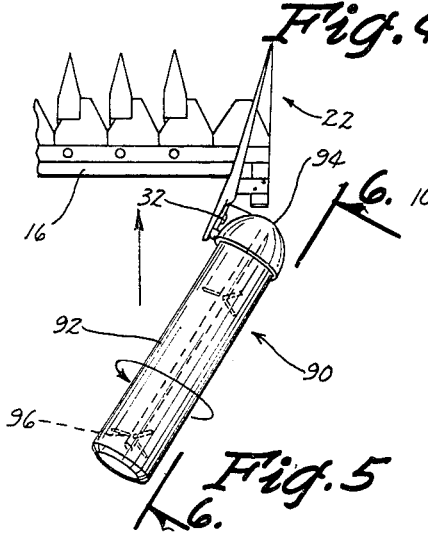
FIG. 5 is a fragmentary top plan view similar to FIG. 2 but showing an alternate embodiment of this invention.
Figure 6:
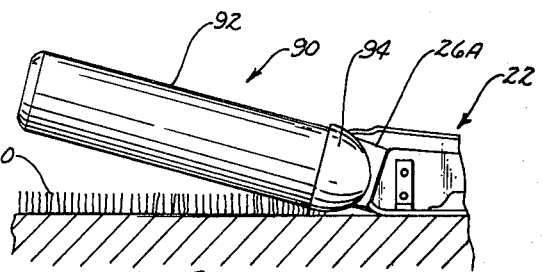
FIG. 6 is an elevation view taken along line 6—6 in FIG. 5.

In FIGS. 5 and 6 an alternate embodiment generally referred to by the reference numeral 90 is shown and includes an elongated cylindrical member 90 to be telescopically received in a nose portion 94 having a convex peripheral surface. The cylindrical portion 92 is mounted on a longitudinally extending shaft 96 which extends along the length of the cylindrical portion and is rotatably secured to the nose portion 94 and thus permits relative rotation between the cylindrical portion 92 and the nose portion 94 which is fixedly secured by a bracket 26A to the outer shoe 22 by the bolt 32. Again it is seen that no possible clogging of the roto divider can occur since the front end of it is positioned on the outer side of the outer shoe 22 and the nose portion is rounded to deflect any material that should engage it. It is also seen in FIG. 6 that rotation of the cylindrical member 92 is caused by the stubble 100 engaging the under side of the cylindrical member and also when the cut material falls onto the top of the cylindrical member it will tend to rotate it forwardly.

Some changes may be made in the construction and arrangement of my mowing machine without departing from the real spirit and purpose of my invention, and it is my intention to cover by my claims, any modified forms of structure or use of mechanical equivalents which may be reasonably included within their scope.

I claim:

1. A mowing machine having a sickle bar with cutting means along its length, said bar having an inner and an outer end, an elongated roller divider freely rotatably mounted at one end to the outer end of said sickle bar and positioned to extent rearwardly and upwardly, and inwardly relative to said sickle bar, said roller comprising a forward nose portion which merges at its rear end integrally into a cylindrical portion, said nose portion having an outwardly facing convex outer surface whereby said roller is adapted to have only line contact between the ground and said convex nose portion and said contact being remote from the forward end of said convex nose portions.

2. The structure of claim 1 wherein said roller has an imperforate peripheral outer surface along its nose portion and cylindrical portion.

3. The structure of claim 2 wherein said cylindrical portion has a diameter no larger than the largest diameter of said convex nose portion.

4. The structure of claim 3 wherein said roller is pivotally connected to said outer end of said sickle bar thereby being free to pivot upwardly upon hitting an obstruction.

5. The structure of claim 4 wherein a stop means is provided to limit downward pivotal movement of said roller.

6. The structure of claim 5 wherein said sickle bar has a ground engaging shoe on its outer end and said roller is connected to the outer side of said shoe.

7. The structure of claim 6 wherein said connection between said roller and said shoe includes a shaft on the longitudinal axis of said roller extending outwardly through the apex of said convex nose portion and said shaft is pivotally connected to said shoe with said roller free to rotate on said shaft.

References Cited

UNITED STATES PATENTS

| 11,579 | 8/1854 | Whitely | 56—317 |
| 293,485 | 2/1844 | Mason | 56—50 |
| 382,536 | 5/1888 | Langley | 56—50 |
| 1,112,768 | 10/1914 | Carrick | 56—317 |
| 1,256,700 | 2/1918 | King | 56—317 |
| 2,542,617 | 2/1951 | Barney | 56—314 XR |

FOREIGN PATENTS

| 97,574 | 2/1923 | Switzerland. |
| 212,599 | 3/1941 | Switzerland. |

RUSSELL R. KINSEY, Primary Examiner